US006955084B2

(12) United States Patent
Challoner et al.

(10) Patent No.: US 6,955,084 B2
(45) Date of Patent: Oct. 18, 2005

(54) ISOLATED RESONATOR GYROSCOPE WITH COMPACT FLEXURES

(75) Inventors: A. Dorian Challoner, Manhattan Beach, CA (US); Kirill V. Shcheglov, Los Angeles, CA (US)

(73) Assignees: The Boeing Company, Chicago, IL (US); California Institute of Technology, Pasadena, CA (US)

( * ) Notice: Subject to any disclaimer, the term of this patent is extended or adjusted under 35 U.S.C. 154(b) by 266 days.

(21) Appl. No.: 10/410,744

(22) Filed: Apr. 10, 2003

(65) Prior Publication Data

US 2003/0205087 A1 Nov. 6, 2003

Related U.S. Application Data

(63) Continuation-in-part of application No. 10/370,953, filed on Feb. 20, 2003, which is a continuation-in-part of application No. 09/928,279, filed on Aug. 10, 2001, now Pat. No. 6,629,460.

(51) Int. Cl.[7] .............................................. G01C 19/00
(52) U.S. Cl. .................................................. 73/504.16
(58) Field of Search ........................ 73/504.02, 504.03, 73/504.04, 504.12, 504.16

(56) References Cited

U.S. PATENT DOCUMENTS

| 392,650 A | 11/1888 | Warvous |
| 5,226,321 A | 7/1993 | Varnham et al. |
| 5,646,346 A | 7/1997 | Okada |

(Continued)

FOREIGN PATENT DOCUMENTS

| DE | 44 42 033 A1 | 5/1996 |
| WO | WO 96/38710 | 12/1996 |
| WO | WO 98/15799 | 4/1998 |

OTHER PUBLICATIONS

D. Wright et al, "The HRG Applied to a Satellite Attitude Reference System," Guidance and Control, American Astronautical Society, Advances in Astronautical Sciences, 1994, 86;1–13.
M. W. Putty et al., "A Micromachined Vibrating Ring Gyroscope," Solid State Sensor and Actuator Workshop, Transducer Research Foundation, Hilton Head, 1994, pp. 213–220.
T. K. Tang et al, "Silicon Built Micromachined Vibratory Gyroscope," Solid State Sensor and Actuator Workshop, Transducer Research Foundation, Hilton Head, South Carolina, Jun. 2–6, 1996, 6 pgs.
N. Barbour et al., "Micromechanical Silicon Instrument and Systems Development at Dearper Laboratory," ATAA Guidance Navigation and Control Conference, American Institute of Aeronautics and Astronautics, San Diego, CA, Jul. 29–31, 1996, Paper No. 96–3709, pp. 1–7.
J.D. Johnson et al., "Surface Micromechanical Angular Rate Sensor," A1995 SAE Conference, Paper No. 95053, pp. 77–83.
T. Fujita et al., "Disk–shaped bulk micromachined gyroscope with vacuum sealing," *Sensors and Actuators A: Physical,* vol. 82, Issues 1–3, May 15, 2000, pp. 198–204.

Primary Examiner—Richard A. Moller
(74) Attorney, Agent, or Firm—Gates & Cooper LLP (57) ABSTRACT

The present invention discloses a gyroscope comprising an isolated resonator including a post proof mass and counterbalancing plate. One or more double beam flexures each interconnect the counterbalancing plate and the proof mass with a first and a second beam attached to the post proof mass and a third and a fourth beam attached to the counterbalancing plate. A baseplate is affixed to the resonator by the double beam flexures. The counterbalancing plate and the proof mass transfer substantially no net momentum to the baseplate when the resonator is excited.

42 Claims, 8 Drawing Sheets

U.S. PATENT DOCUMENTS

| | | |
|---|---|---|
| 5,665,915 A | 9/1997 | Kobayashi et al. |
| 5,783,749 A | 7/1998 | Lee et al. |
| 5,894,090 A | 4/1999 | Tang et al. |
| 5,905,202 A | 5/1999 | Kubena et al. |
| 5,920,012 A | 7/1999 | Pinson |
| 6,009,751 A | 1/2000 | Ljung |
| 6,044,705 A | 4/2000 | Neukermans et al. |
| 6,164,134 A | 12/2000 | Cargille |
| 6,289,733 B1 | 9/2001 | Challoner et al. |
| 6,367,786 B1 | 4/2002 | Gutierrez et al. |

ISOLATED RESONATOR GYROSCOPE WITH COMPACT FLEXURES

CROSS-REFERENCE TO RELATED APPLICATIONS

This continuation-in-part application claims the benefit under 35 U.S.C. §120 of the following co-pending and commonly-assigned U.S. utility patent applications, which are all incorporated by reference herein:

U.S. patent application Ser. No. 09/928,279, filed Aug. 10, 2001, and entitled "ISOLATED RESONATOR GYROSCOPE", by A. Dorian Challoner, now U.S. Pat. No. 6,629,460, Issued Oct. 7, 2003; and U.S. patent application Ser. No. 10/370,953, filed Feb. 20, 2003, and entitled "ISOLATED RESONATOR GYROSCOPE WITH A DRIVE AND SENSE PLATE", by A. Dorian Challoner and Kirill V. Shcheglov.

STATEMENT OF GOVERNMENT RIGHTS

This invention was made with Government support awarded by the Government. The Government has certain rights in this invention.

BACKGROUND OF THE INVENTION

1. Field of the Invention

The present invention relates to gyroscopes, and in particular to improved resonator microgyroscopes and their manufacture. More particularly, this invention relates to microgyroscopes with compact flexures.

2. Description of the Related Art

Gyroscopes are used to determine direction based upon the sensed inertial reaction of a moving mass. In various forms they are often employed as a critical sensor for vehicles such as aircraft and spacecraft. They are generally useful for navigation or whenever it is necessary to autonomously determine the orientation of a free object.

Older conventional gyroscopes were very heavy mechanisms, employing relatively large spinning masses by current standards. A number of recent technologies have brought new forms of gyroscopes, including optical gyroscopes such as laser gyroscopes and fiberoptic gyroscopes as well as vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined hemispherical resonator gyroscopes (e.g. a Litton hemispheric resonator gyroscope inertial reference unit). However, both of these are very expensive, large and heavy.

In addition, although some prior symmetric vibratory gyroscopes have been produced, their vibratory momentum is transferred directly to their baseplates or packages. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating ring gyroscope, are known to have some desirable isolation and vibrational symmetry attributes, however, these designs are not suitable for or have significant limitations with thin planar silicon microfabrication. The hemispherical resonator employs the extensive cylindrical sides of the hemisphere for sensitive electrostatic sensors and effective actuators, however its high aspect ratio, 3D curved geometry is unsuitable for inexpensive thin planar silicon microfabrication. The thin ring gyroscope while suitable for planar silicon microfabrication lacks electrostatic sensor and actuators that take advantage of the extensive planar area of the device.

Vibration isolation using a low-frequency seismic support is also known (e.g., U.S. Pat. No. 6,009,751, which is incorporated by reference herein), however such increased isolation comes at the expense of proportionately heavier seismic mass and/or lower support frequency. Both effects are undesirable for compact tactical inertial measurement unit (IMU) applications.

Furthermore, the scale of previous silicon microgyroscopes (e.g., U.S. Pat. No. 5,894,090) has not been optimized for navigation grade performance resulting in higher noise and drift than desired. This problem stems from a use of thin epitaxially grown silicon flexures to define critical vibration frequencies that are limited to 0.1% thickness accuracy. Consequently device sizes are limited to a few millimeters. Such designs exhibit high drift due to vibrational asymmetry or unbalance and high rate noise due to lower mass which increases thermal mechanical noise and lower capacitance sensor area which increases rate errors sensor electronics noise.

Scaling up of non-isolated silicon microgyros is also problematic because external energy losses will increase with no improvement in resonator Q and no reduction in case-sensitive drift. An isolated cm-scale resonator with many orders of magnitude improvement in 3D manufacturing precision is required for navigation grade performance.

Conventionally machined navigation grade resonators such as in hemispherical or shell gyros have the optimum scale, e.g. 30 mm and 3D manufacturing precision and hence desirable drift and noise performance, however such gyros are expensive and slow to manufacture. Conventional laser trimming of mechanical resonators can further improve manufacturing precision to some degree, however this process is not suitable for microgyros with narrow mechanical gaps and has limited resolution, necessitating larger electrostatic bias adjustments in the final tuning process.

There is a need in the art for small gyroscopes with greatly improved performance for navigation and spacecraft payload pointing. There is also a need for such gyros to be cheaper and more easily manufactured with greater 3D mechanical precision. There is still further a need for such gyros to have desirable isolation and vibrational symmetry attributes while being compatible with planar silicon manufacturing. Finally, there is a need for such gyros to have compact efficient structural designs which minimize reactions to their supporting structures. The present invention satisfies all these needs.

SUMMARY OF THE INVENTION

The present invention provides an affordable vibratory gyroscope with navigation grade performance by means of a precision isolated symmetric planar resonator of optimum scale that can be fabricated with silicon photolithography from commercial double-sided polished silicon wafers with low total thickness variation.

The present invention provides an isolated resonator comprising two bodies with transverse inertia symmetry about an axis aligned with an input axis and elastically supported so that their axes of symmetry and centers of mass coincide and together form two differential rocking modes of vibration transverse to the axis of symmetry. The two bodies are supported on a baseplate having an inertial rate input axis and exhibit substantially equal frequencies distinct from other modes of vibration, mutually orthogonal and imparting substantially zero net momentum to the baseplate. Primary (drive and sense) electrodes are disposed proximate to the resonator to excite and sense movement of the resonator.

In the detailed embodiments which follow, a first one of the bodies is a post proof mass, a second one of the bodies is a counterbalancing plate. In one exemplary embodiment, the drive and sense electrodes are affixed to the baseplate beneath the counterbalancing plate. The drive electrodes are aligned to drive a first one of the differential rocking modes to vibrate. The sense electrodes are aligned to sense the motion of the second differential rocking mode induced by Coriolis accelerations resulting from the inertial rate input and internally driven differential rocking motion about the first mode axis.

A key element of the present invention is a symmetric double beam flexure arrangement for such an isolated resonator gyroscope which results in reduced reactions to the baseplate. The first and second (e.g., inner) beams of each double beam flexure are attached to the proof mass (e.g., an inner plate portion) and the third and fourth (e.g., outer) beams of each pair are attached to the counterbalancing plate. The symmetry and close radial spacing of the parallel double beams result in comparable (but opposite) moments and forces on each beam element during the counterbalanced rocking motion of the resonator. The convergence of each beam pair into a center beam prior to attachment to the baseplate results in cancellation of moments and forces and a reduced reaction on the baseplate mounting pad. Further, the net sum of these residual reactions from all the beams attached to the baseplate can be nulled by adjustment of the proof mast length (e.g, a vertical post of the proof mass). In addition, the spring constants of the inner versus the outer beams can be independently trimmed or electrostatically modified to provide the desired reactionless counterbalanced rocking motion.

A typical embodiment of the present invention comprises a gyroscope including an isolated resonator having a counterbalancing plate and a proof mass. One or more double beam flexures each interconnect the counterbalancing plate and the proof mass with a first and a second beam attached to the proof mass and a third and a fourth beam attached to the counterbalancing plate. A baseplate is affixed to the resonator by the double beam flexures. The counterbalancing plate and the proof mass transfer substantially no net momentum to the baseplate when the resonator is excited.

Further embodiments of the invention can also include a mounting plate attached to the baseplate through at least one isolation flexure to further isolate the resonator. In addition, the counterbalancing plate can include extensive planar regions to react with the drive and sense electrodes for operating the gyroscope. An additional secondary element can also be used for trimming isolation of the resonator.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

Embodiments of the present invention generally describe an isolated planar vibratory gyroscope that provides a desired differential rocking mode vibration of a counterbalancing plate versus a central elongated proof mass, while ensuring that the undesirable common rocking mode frequency is practically separated above the desirable differential mode frequency. Embodiments of the invention include isolation that can be simply achieved by adjusting the elongated proof mass (i.e., post) length. The inertias of the proof mass and counterbalancing plate do not have to be as precisely equal.

Importantly, a double beam flexure is used to interconnect the counterbalancing plate with the proof mass. The unique double beam flexure includes four beam segments, two connecting to the proof mass and two connecting to the counterbalancing plate. In a symmetric configuration, the double beam flexure provides reduced reaction to the baseplate supporting the resonator and thereby improves isolation of the resonator. During the counterbalancing rocking motion of the resonator, the double beam flexure produces comparable but opposite moments and forces on each beam element.

Further embodiments of the invention also provide integral vibration isolation to the baseplate through additional baseplate isolation flexures, attaching the baseplate to a mounting plate to further improve resonator isolation.

Embodiments of the invention can also include a secondary element (e.g., an inner electrode plate) for electrostatic balancing or trimming of the isolation of the differential rocking mode from the baseplate and outer mounting plate. In a typical embodiment, the secondary element is affixed to the baseplate and disposed proximate to a support plate portion of a central proof mass. The secondary element, in conjunction with the primary element (e.g., the drive and sense electrodes), also permits selective electrostatic control of the differential rocking mode of the gyroscope. Furthermore, the secondary element can be applied to isolated resonator gyroscopes beyond those employing a central proof mass and counterbalancing plate as described herein.

Typical embodiments of the present invention also use the counterbalancing plate to react with the sense and drive electrodes. Thus, the counterbalancing plate serves a dual role, forming an isolated resonator with the proof mass and providing a surface for reacting with the drive and sense electrodes. In addition, to enhance the operation of the gyroscope, the counterbalancing plate can be structured with extensive planar surface regions to improve reaction with the drive and sense electrodes.

All of the moving elements critical to performance can be photolithographically machined with 3D precision from a single double-sided polished silicon wafer. The precise planar construction, large planar areas for electrostatic sense and control and favorable mass distribution provide symmetric rocking motion for sensitive tuned vibratory gyroscope operation with ideal mechanical isolation from external disturbances.

Embodiments of the invention generally comprise an all-silicon, isolated symmetric vibratory gyroscope that is inexpensive to produce using photolithography and that can be scaled large enough (e.g., approximately 20 mm resonator) to achieve the required performance. Residual manufacturing errors can be removed prior to packing using focused ion beam or laser milling of selected silicon elements to further tune, align or balance the gyroscope. For high vibration applications an upper electrode plate can be bonded to the baseplate above the resonator and used differentially with the baseplate electrodes to remove scale factor dependence on axial gap variations and vibration. Combined with low-cost closed-loop analog control electronics, and conventional discrete metal or ceramic vacuum packaging a complete redundant inertial reference unit can be inexpensively manufactured, even when produced in small quantities. Further, when combined with a low-power digital control electronics application-specific integrated circuit (ASIC) for much larger quantities, a "golf ball" sized inertial navigation unit can be produced. Such a compact, lightweight and inexpensive precision inertial reference unit can find a wide range of applications in military as well as commercial products.

2.0 Exemplary Resonator Gyroscope Embodiment

Figure 1A:
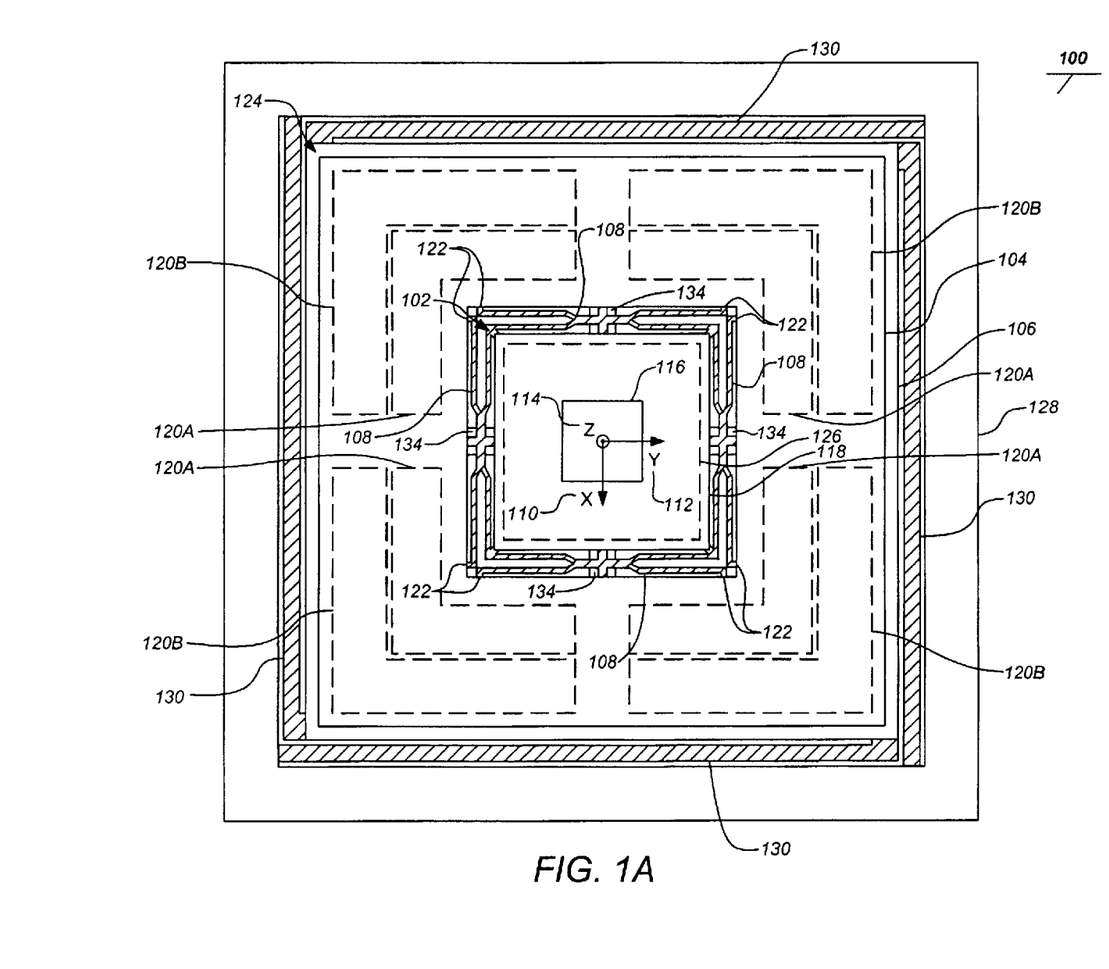
FIG. 1A depicts a top view of a reactionless resonator gyroscope of the present invention.

FIG. 1A depicts a top view of an isolated resonator gyroscope 100 embodiment of the present invention. The gyroscope 100 comprises a unique resonator 124 which includes a post inertial proof mass 102 and a counterbalancing plate 104. The counterbalancing plate 104 has a rocking inertia substantially comparable to that of the proof mass 102 and these two bodies interact as described above. The counterbalancing plate 104 and proof mass 102 are coupled to a baseplate 106 at four mounting pads 134 by way of double beam flexures 108. The principal axes of concern which will be referenced throughout the specification are the X axis 110, the Y axis 112 and the Z axis 114 (which is directed out of the page of FIG. 1A). The counterbalancing plate 104 can also be designed in any other shape, such as a circular ring or other arbitrary shape so long as the two bodies (proof mass 102 and counterbalancing plate 104) interact as previously described.

Figure 1B:
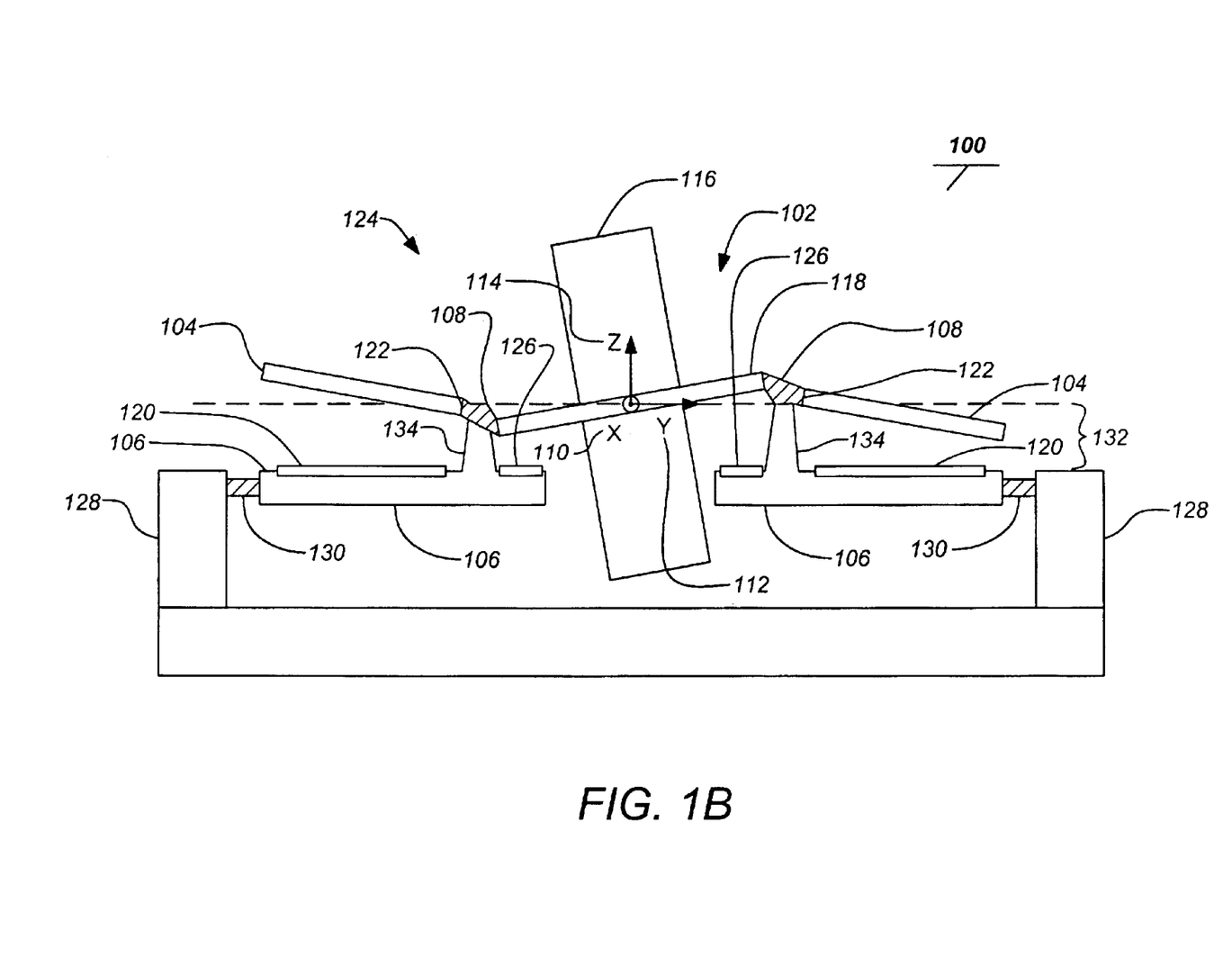
FIG. 1B depicts a side view of a reactionless resonator gyroscope of the present invention in an exaggerated displaced position.

FIG. 1B depicts a side view of an isolated resonator gyroscope 100 of the present invention in an exaggerated displaced position. The gyroscope is shown displaced about the X axis 110. The mechanical assembly comprises a central inertial proof mass 102 element interconnected to an outer counterbalancing plate 104 and affixed to a baseplate 106 via elastic double beam flexures 108 attached at the four mounting pads 134. In one embodiment, the counterbalancing plate 104, double beam flexures 108 and baseplate 106 for the central inertial proof mass 102 can be photolithographically etched-through from the same double-sided polished crystal silicon wafer to produce a precision planar resonator gyroscope.

The axisymmetric resonator is coupled to a baseplate 106 such that the axisymmetric counterbalancing plate 104 can freely vibrate against the axisymmetric central proof mass 102 with counterbalanced oscillatory rocking motion and results in a distinct differential rocking mode with substantially no momentum transfer to, or net reaction on, the baseplate 106.

The proof mass 102 can be constructed in various forms, however the inertial distribution of the central proof mass is designed to have significantly more mass out of plane than in plane and hence high angular gain, or Coriolis reaction to inertial rate input with driven rocking motion of the resonator 124. To achieve this, the proof mass 102 comprises a vertical post portion 116 (elongated along the Z axis 114). The post portion 116 is disposed on a small central support plate portion 118 (in the X-Y plane). The post portion 116 and support plate portion 118 can be formed together from a thick silicon wafer for manufacturing ease as previously mentioned. Alternately, the proof mass 102 can be bonded as a separable central post portion 116 to the support plate portion 118 formed from a thin silicon wafer.

By comparison, previous vibratory gyroscopes with isolated resonators have relied on expensive conventional 3D machining and assembly to achieve isolation. For example, the 3D hemispherical resonator gyroscope must be machined by conventional lathe or other time consuming sequential mass removal method. Simple micromachined gyroscopes without self-isolated design employ external low-frequency isolation mechanisms to gain a degree of isolation at the expense of increasing seismic suspension mass and increased deflections due to gravity loads. Asymmetric tuning fork vibratory gyroscopes provide isolation about the drive axis only and are subject to external disturbance about the output sense axis. The original cloverleaf microgyroscope (e.g., U.S. Pat. No. 5,894,090 to Tang et al.) is susceptible to external rocking disturbances about its drive and output axes.

As further detailed hereafter, electrostatic driving and sensing can be implemented with the drive and sense electrodes 120A, 120B (collectively referred to as electrodes 120) affixed to the baseplate 106 beneath the large planar surfaces of the counterbalancing plate 104. See FIG. 1. The large surface area of the counterbalancing plate 104 is used to react with the driving and sensing electrodes 120. In general, the extensive planar electrode 120 regions are formed on the baseplate 106 beneath the counterbalancing plate 104. The counterbalancing plate 104 can be designed with extensive planar regions 120 to provide a large surface area for the driving and sensing electrodes disposed thereon. In embodiments of the present invention, the extensive planar regions 120 are formed by narrowing the gap between the proof mass 102 and the counterbalancing plate 104 (in the X-Y plane). This structure is enabled in part by the close parallel beams of the double beam flexures 108 and their arrangement around a perimeter of the proof mass 102, as further detailed hereafter, rather than extending in a radial direction from the central proof mass 102.

2.1 Double Beam

Figures 2A, 2B, 2C:
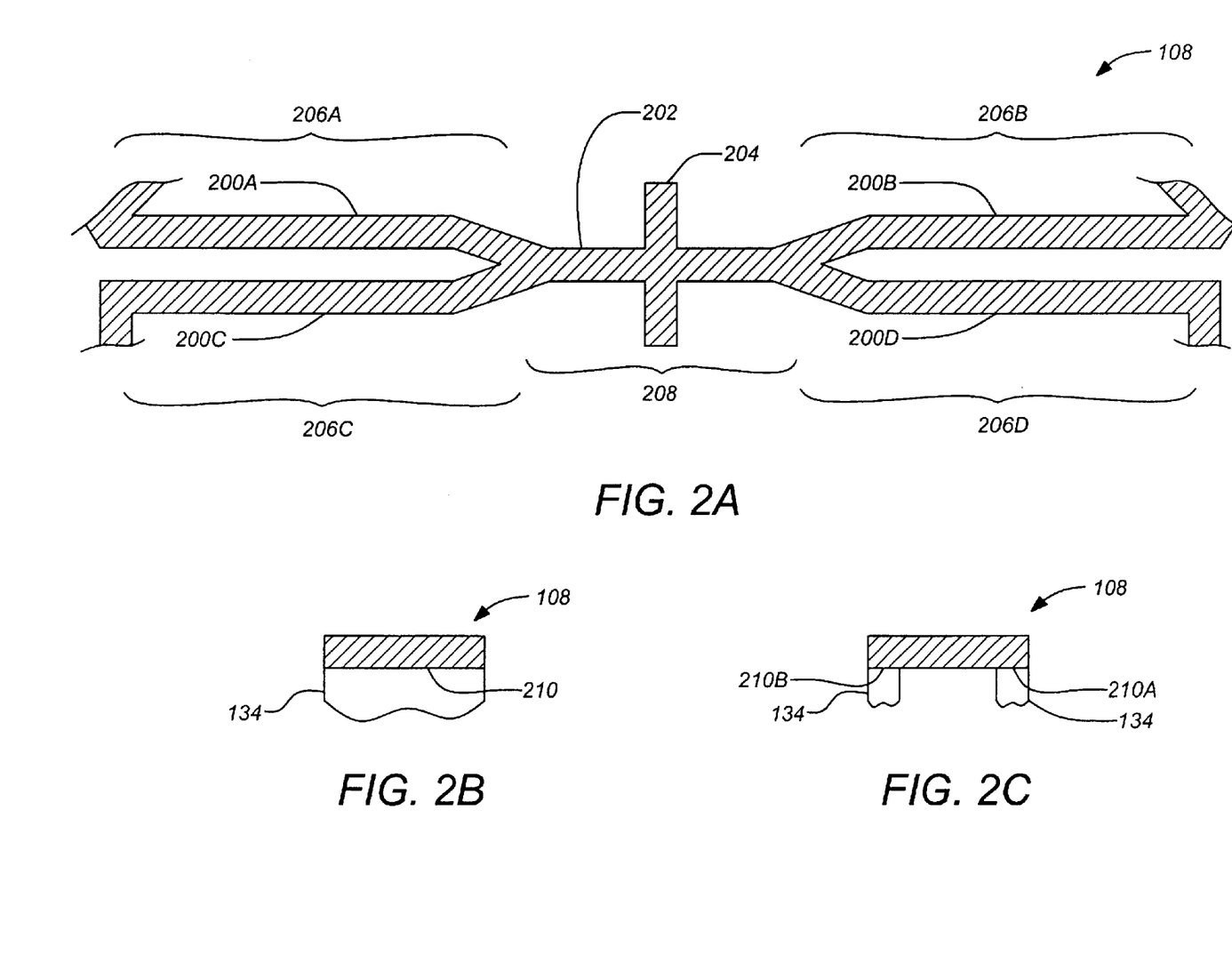
FIG. 2A illustrates an exemplary double beam flexure structure.
FIGS. 2B and 2C illustrate alternate attachments of the double beam flexure to the baseplate.

FIG. 2A illustrates an exemplary double beam flexure 108 structure. The double beam flexure 108 includes a first and a second beam (200A and 200B, respectively) that are attached to the proof mass 200 and a third and a fourth beam (200C and 200D, respectively) that are attached to the counterbalancing plate 104. In addition, the double beam flexure 108 is attached to the baseplate 106 at its center. Note that the term "double" beam indicates that both the proof mass 102 and the counterbalancing plate 104 each utilize two separate attachments to the flexure, as compared to the single attachments of other structures.

In one embodiment of the invention, the first and second beams 200A, 200B are inner beams of a double beam pair, attached to the plate portion 118 of a proof mass 102. The third and fourth beams 200C, 200D are outer beams of a double beam pair, attached to the counterbalancing plate 104. The first and third beams 200A, 200C are parallel and closely spaced, while the second and fourth beams 200B, 200D are similarly arranged. The symmetry and close spacing of the parallel beams 200 results in comparable, but opposite, moments and forces on each beam 200 during the counterbalanced rocking motion of the resonator 124. Each of the beams 200A–200D merge into a center beam 202. In addition, a cross beam 204 which intersects the center beam 202 can also be used to provide the mounting point for the double beam flexure 108 to the baseplate 106.

The merging of each beam pair into a center beam 202 where they are attached to the baseplate mounting pad 134 results in a cancellation of moments and forces and a reduced reaction on the baseplate 106 through the mounting pad 134. Each of the beams 200A–200D and the center beam 202 have lengths 206A–206D, 208, respectively which can be varied to improve the response and isolation of the resonator. The relative lengths 206A–206D of the beams 200A–200D compared with the length 208 of the center beam 202 is key in determining the double beam flexure 108 performance, as this reflects the apportioned merged versus independent lengths of the double beam flexure 108.

Further tuning of the isolation can be effected by altering one or more simple parameters of the resonator 124. For example, the net sum of these residual reactions from all the beams 200A–200D attached to the baseplate 106 can be nulled by mere adjustment of the length of the vertical section 116 of the proof mass 102. In addition, the spring constants of inner beams 200A, 200B versus the outer beams 200C, 200D can be mechanically trimmed or electrostatically modified to provide the desired reactionless counterbalanced rocking motion. Moreover, the double beam structure allows tuning of the resonator by independently machining each beam 200A–200D of the double beam flexure 108 (principally, in width).

FIGS. 2B and 2C illustrate alternate attachments of the double beam flexure 108 to the baseplate 106 at the mounting pad 134. The bond 210 is typically made between the cross beam 204 and the mounting pad 134, however, a configuration without the cross beam is also possible with the bond 210 made directly to the center beam 202. The dimensions and configuration of the mounting pad 134 can be further optimized to reduce the residual motion at each bonding pad. For example, FIG. 2B illustrates a bond 210 across the full mounting pad 134. Alternately, FIG. 2C illustrates two bonds 210A, 210B at the inboard and outboard ends of the mounting pad 134 (which can also be implemented as two separate pads 134). Thus, an eight-mounting pad configuration (two for each double beam flexure 108) is possible instead of the typical four-mounting pad arrangement. This may reduce potential friction losses at the bond 210 interface.

In addition, although the double beam flexure 108 is preferably symmetric (about the cross beam 204), other variations are also possible. For example, the double beam flexure 108 can be modeled with each beam 200A–200D having a different length and/or width. An asymmetric attachment of the center beam 202 and/or cross beam 204 is also possible.

2.2 Isolation Trimming Using a Secondary Element

All vibratory gyroscopes employ a rotation sensing mechanical element which is driven to oscillate in a first mode, i.e. the input or drive mode. A Coriolis acceleration of the element under rotation induces energy transfer from the input mode to a second mode, i.e. the output or sense mode. The second mode produces an excitation in the sense element which is then detected. Optimum performance of a vibratory gyroscope is obtained when the drive and sense modes have the same resonant frequency and a high Q factor. The response to the Coriolis acceleration is then mechanically amplified by the Q factor of the resonance and provides improved sensor performance. Closed loop control of the resonator sense mode (e.g. co-pending U.S. application Ser. No. 09/488,425, which is hereby incorporated by reference herein) provides Coriolis force-rebalance, sense mode damping and wide gyroscope bandwidth.

Embodiments of the present invention can use bias trimming to modify the overall modal stiffness with one or more secondary elements 126 (e.g., additional electrodes or other suitable driving means), located as shown in FIG. 1A. The secondary element 126 is employed to drive the resonator 124 separately from the drive and sense electrodes located on the counterbalancing plate 104. Thus, a secondary element 126 can be used to maintain this isolation and tuning after vacuum packaging and at varying temperatures throughout the life of the gyroscope.

The secondary element 126 can apply electrostatic balancing or trimming of the isolation of the differential rocking mode from the baseplate 106 (and outer mounting plate 128, discussed hereafter). In a typical embodiment, the secondary element 126 is disposed beneath the support plate portion 118 of a central proof mass 102. Thus, the secondary element also affords independent control of one body (the proof mass 102) from the other body (the counterbalancing plate 104). The secondary element 126, operated in conjunction with the primary element (i.e., the drive and sense electrodes 120A, 120B beneath the counterbalancing plate 104), permits selective electrostatic control of the differential rocking mode of the gyroscope 100. It should be noted that the use of the secondary element 126 can be applied to other isolated resonator gyroscopes, beyond those employing a central proof mass 102 and counterbalancing plate 104 as detailed herein.

2.3 Integral Baseplate Isolation

The baseplate 106 may be a relatively thick silicon plate of rigid material. Such a thick rigid baseplate 106 can be directly bonded to the remainder of the gyroscope in a vacuum package. Alternatively, a more flexible thin baseplate 106 may be used to reduce cost and ease assembly with standard wafer processing equipment. Common elasticity in the resonator flexures 108 such as in the attachment to the baseplate 106 provides inherent separation of the differential rocking mode frequency from the common rocking mode of vibration. The singular attribute of any of these arrangements is that any external motion of the gyroscope package cannot excite differential rocking motion of the resonators, unless such motion is first internally driven and only then by virtue of Coriolis accelerations due to rotation of the gyroscope about the input axis or axis of inertial symmetry.

In further embodiments of the invention, a baseplate 106 employing integral isolation can also be used to enhance isolation of the resonator 124. To achieve this, the baseplate 106 is attached to an outer mounting plate 128 via one or more isolation flexures 130. See FIGS. 1A and 1B.

3.0 Producing an Isolated Resonator Gyroscope

Figure 3:
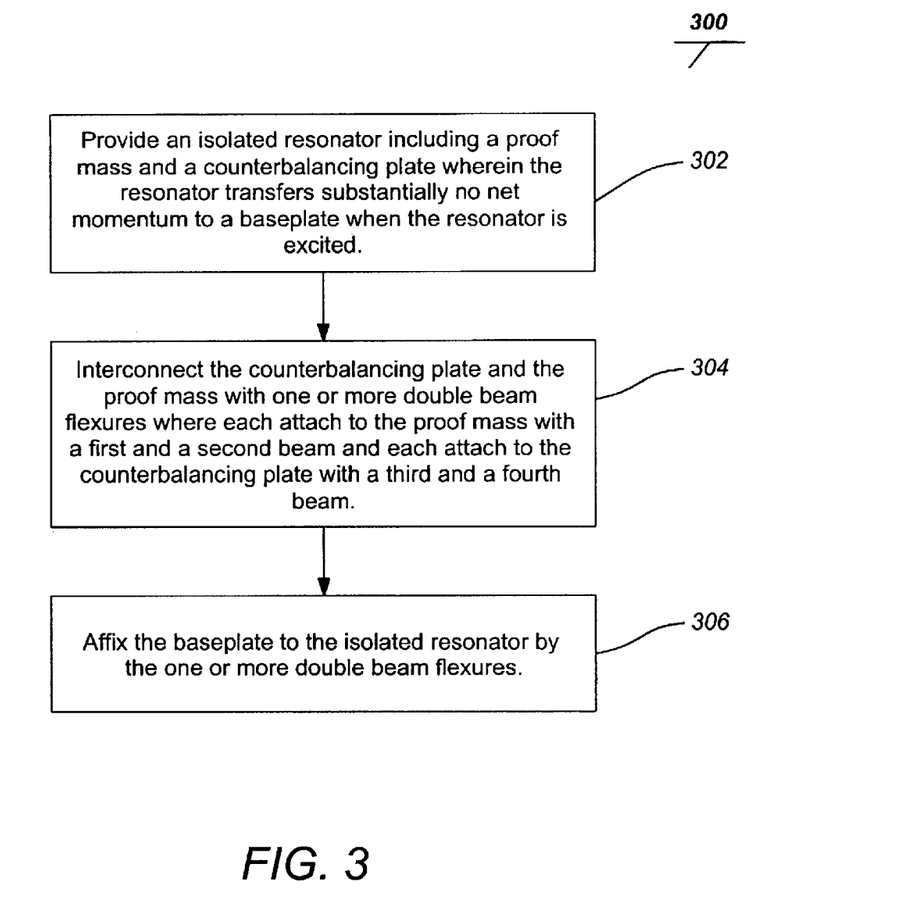
FIG. 3 is a flowchart of a typical method of producing an isolated resonator gyroscope of the invention.

FIG. 3 is a flowchart of a typical method 300 of producing an isolated resonator gyroscope 100 of the invention. The method comprises providing an isolated resonator 124 including a proof mass 102 and a counterbalancing plate 104 at block 302, wherein the isolated resonator 124 transfers substantially no net momentum to a baseplate 106 when the resonator 124 is excited. Next at block 304, the counterbalancing plate 104 and the proof mass 102 are interconnected with one or more double beam flexures 108 where each attach to the proof mass 102 with a first and a second beam 200A, 200B and each attach to the counterbalancing plate 106 with a third and a fourth beam 200C, 200D. Finally, at block 306, a baseplate 106 is affixed to the resonator 124 by the one or more double beam flexures 108. The drive and sense electrodes 120A, 120B and optional secondary element 126 can be affixed to the baseplate 106 prior to affixing the resonator 124 to the baseplate 106.

Providing the isolated resonator 124 may comprise etching the entire proof mass 102 and counterbalancing plate 104 from a single double-sided polished crystal silicon wafer or etching only a plate portion 118 of the proof mass 102 and the counterbalancing plate 104 from the silicon and bonding on a separate vertical portion 116 of the proof mass 102. For example, the counterbalancing plate 104, the plate portion 118 of the proof mass 102 and the double beam flexures 108 can be through-etched from double-sided polished single crystal silicon to provide the desired high precision machining, e.g. less than 10 parts per million asymmetry. A rigid pyrex glass post (i.e., the vertical section 116) can be centrally and rigidly attached to each side of the inner plate portion 118 with a high quality anodic bond or a polished single crystal silicon post can alternately be used, attached with gold thermocompression bonding. The four central mounting pads for the resonator 124 can be rigidly attached to the silicon baseplate 106 using a gold thermocompression bond.

The baseplate 106 is also preferably etched from a silicon wafer with standard semiconductor processing. Since the baseplate 106 does not move substantially, by virtue of the disclosed resonator isolation technique, its mechanical precision is of less importance.

4.0 Isolated Resonator Gyroscope Finite Element Model

A finite element model (FEM) of the mechanical structure can be used to select the inner and outer beams 200A–200D and center beam 202 widths and lengths to provide the desired differential rocking mode frequency (proof mass 102 versus the counterbalancing plate 104) and to minimize the reactions at each mounting pad 134. Typically, a common beam length 206A–206D is selected to easily provide the desired cancellation of forces and moments as well as the desired separation between the differential and common rocking mode frequencies. The differential rocking frequency is set below the counterbalancing plate 104 vibration frequencies so that it is substantially rigid in the differential rocking mode. The length of the vertical portion 116 of the proof mass 102 is first set to provide comparable inertia to that of the counterbalancing plate 104. After the above beam design process, the length of the vertical portion 116 is then fine tuned using the FEM to further minimize the reactions at the mounting pads 134.

Figure 4:
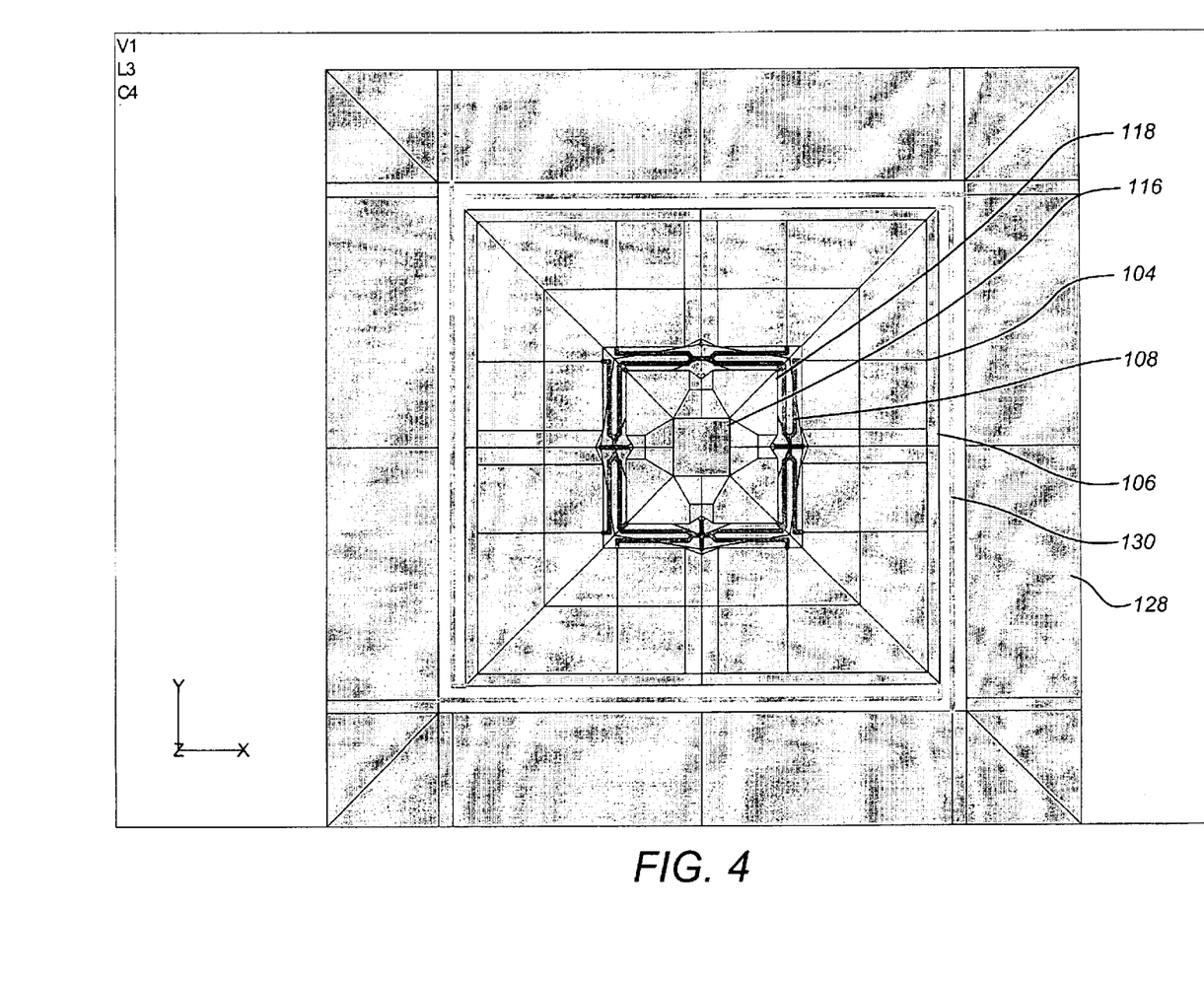
FIG. 4 depicts a plan view of an exemplary isolated resonator gyroscope model.
Figure 5:
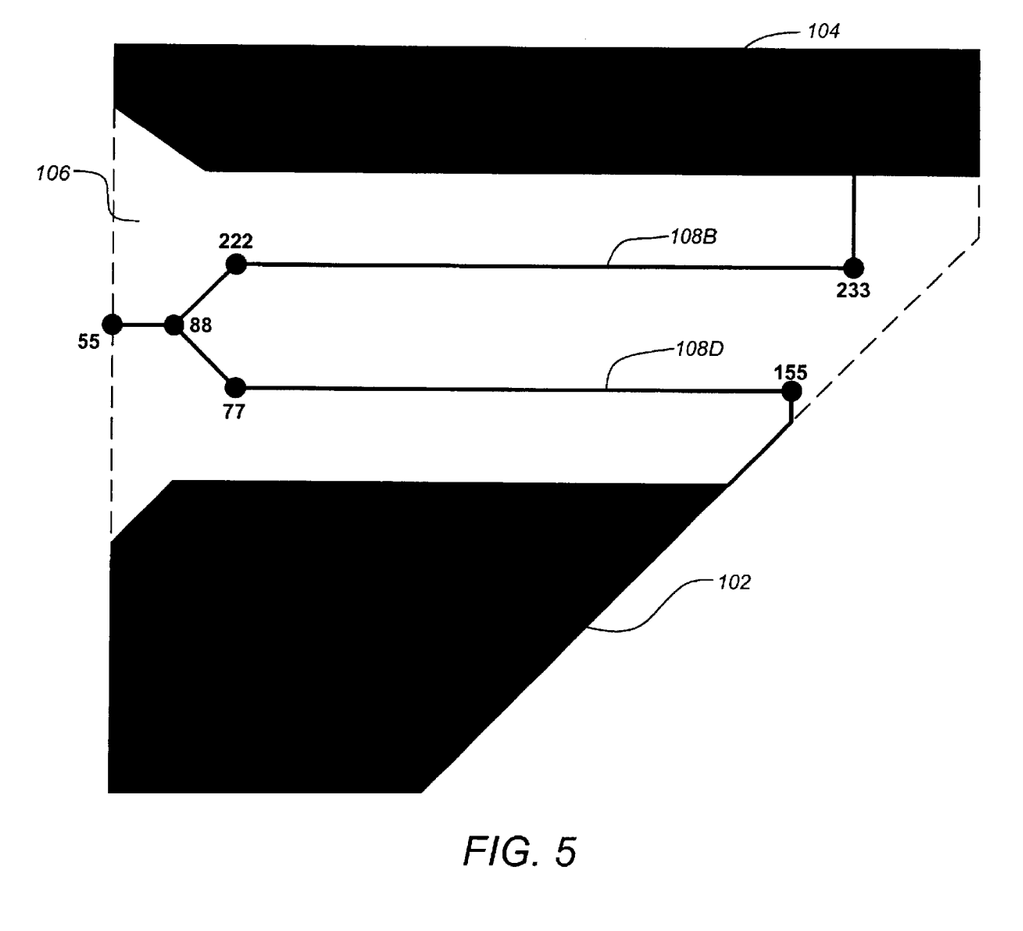
FIG. 5 depicts an enlarged view of the double beam flexure model.
Figure 6:
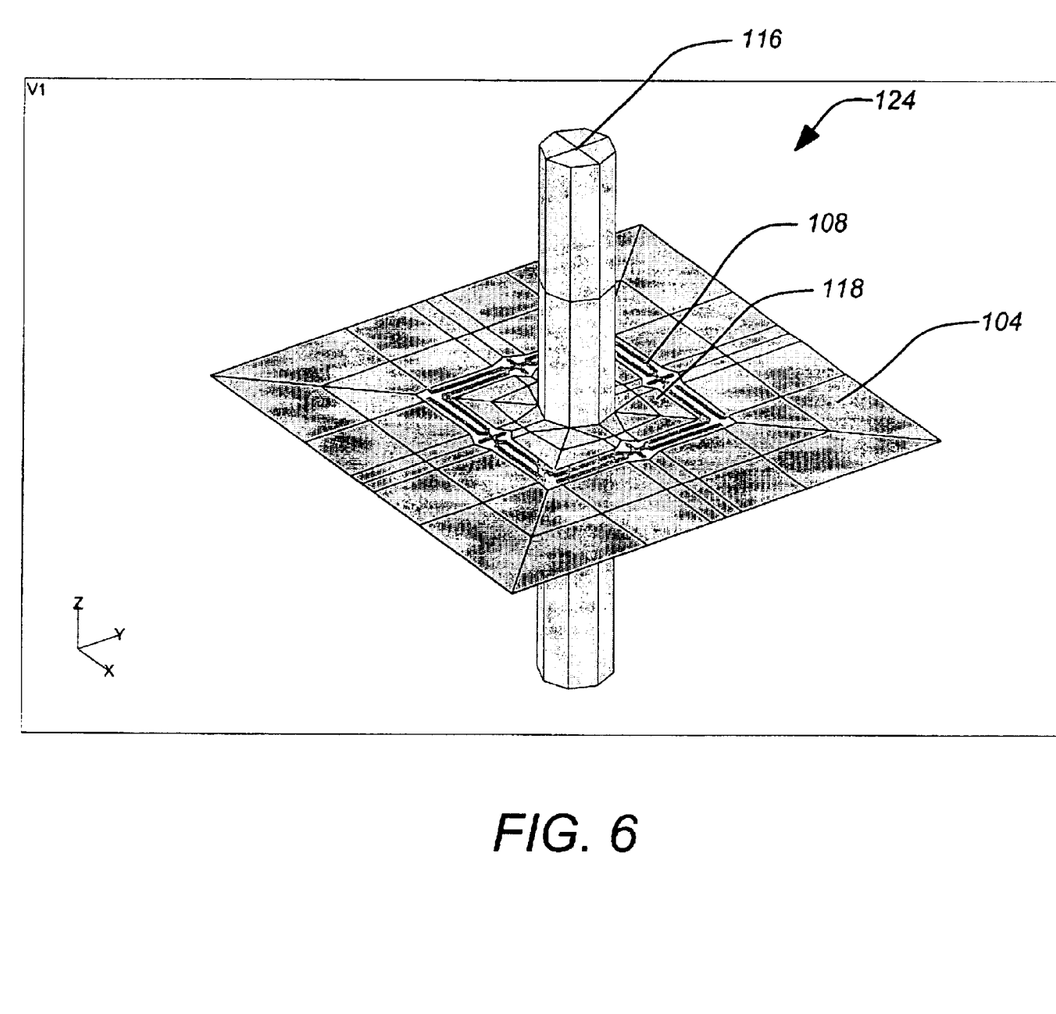
FIG. 6 depicts an isometric view of the exemplary isolated resonator gyroscope model.
Figure 7:
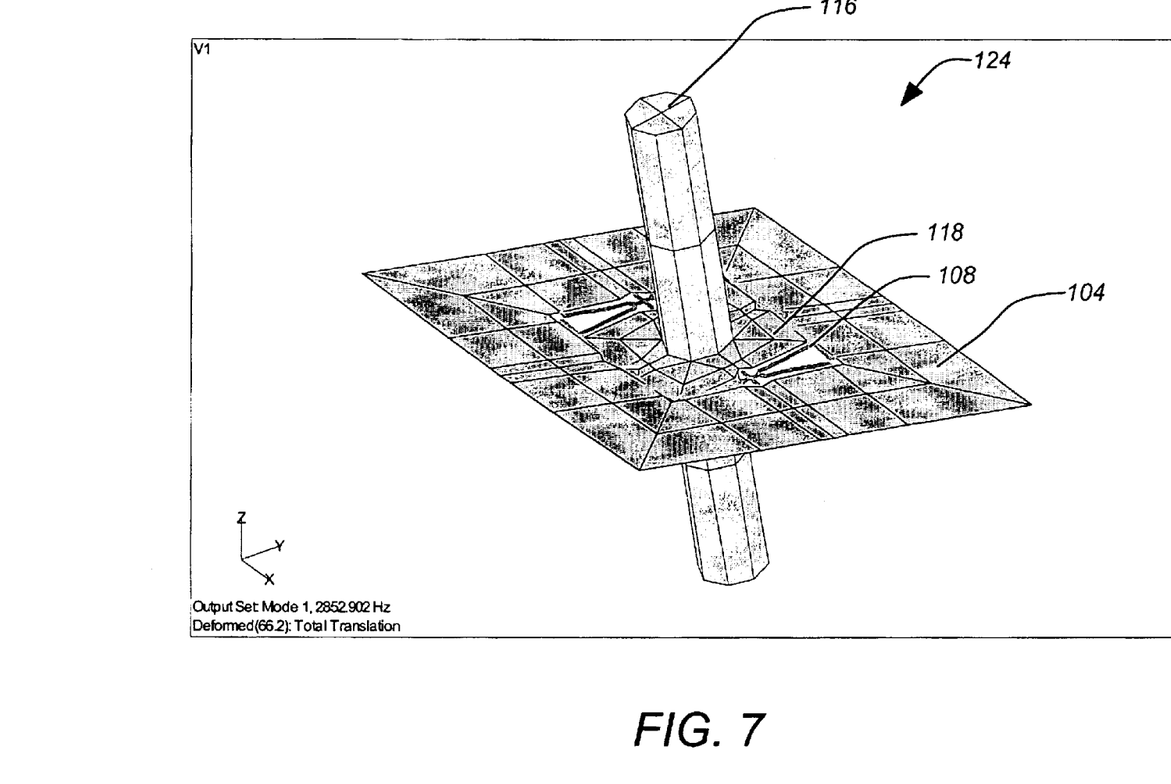
FIG. 7 illustrates a differential rocking mode about the X axis for the exemplary isolated resonator gyroscope model.

FIGS. 4–7 illustrate an exemplary isolated planar resonator gyroscope finite element model shown in different views and different modes. FIGS. 4–6 show the basic finite element model and FIG. 7 further illustrates a rocking mode of the model about the X axis. The model employs an approximately 2 cm length proof mass 102 post rocking against a 2 cm square counterbalancing plate 104, both attached via double beam flexures 108 to a baseplate 106. The baseplate 106 is in turn attached via additional isolation flexures 130 to a mounting plate 128. To illustrate isolation effectiveness there are no mounting constraints applied to the model. Note that rocking mode depicted in FIG. 7 is shown with a highly exaggerated deflection. Double beam flexures 108 and isolation flexures 130 shown in all FIGS. 4–8 are depicted in line form for clarity.

FIG. 5 illustrates a schematic of one half of a symmetric double beam flexure 108. The center beam is modelled with a 500 micron width, while the first and second beams each have a width of 300 microns. The exemplary node coordinates of FIG. 4 are provided in the following table.

| Node Number | Coordinates (mm) |
| --- | --- |
| 55 | 0.0, 3.9, 0.0 |
| 88 | 0.4, 3.9, 0.0 |
| 77 | 0.6, 3.675, 0.0 |
| 155 | 3.55, 3.675, 0.0 |
| 222 | 0.6, 4.125, 0.0 |
| 223 | 3.76, 4.125, 0.0 |

The elements and effective rocking mode operation of an isolated planar resonator gyroscope 100 are shown in FIG. 7. The resonator 124 comprises a central inertial proof mass 102 (including a vertical portion 116 attached to a central plate portion 118) and a counterbalancing plate 104 via elastic beam flexures 108. These beam flexures 108 also attach the resonator 124 to the baseplate 106 (not shown). The silicon baseplate 106 comprises deposited metal electrodes (i.e., the sense and drive electrodes 120 and optional secondary element 126) beneath the extensive planar region of the counterbalancing plate 104. The baseplate 106 is attached to an outer mounting plate 128 with integral isolation flexures 130 connecting the two.

5.0 Exemplary Fabrication Approach of an Isolated Resonator Gyroscope

The planar counterbalancing plate 104 inertia generally matches the post proof mass 102 rocking inertia. Both can be fabricated from polished crystal silicon so that their inertias can be set equal by geometric design. Differential rocking of the post proof mass 102 against the planar counterbalancing plate 104 provides the two desirable degenerate, reactionless modes of vibration for sensing inertial rate with high mechanical gain. The high angular gain of the elongated post proof mass 102 versus the counterbalacing plate 104 provides a high sensitivity to Coriolis force and hence inertial rate sensing normal to the X-Y plane. The baseplate 106 carries the short pillars (e.g., 15–25 micron) for attachment of the resonator double beam flexures 108 and provision of the capacitance gap 132 (see FIG. 1B) for baseplate electrodes to drive and sense the vibration of the planar counterbalancing plate 104 of the resonator 124. The baseplate 106 can also include the integral isolation flexures 130 and an outer mounting plate 128 for packaging as previously described.

The present invention is applicable to navigation grade vibratory gyroscopes in rugged environments. The isolation of the two rocking modes from rigid baseplate motion ensures that modal damping and associated gyroscope rate drift will be determined primarily by the losses within the precision machined silicon resonator and not by the much less precise external packaging losses. The inherently repeatable Q of bulk crystal silicon and the excellent symmetry which has been demonstrated through photolithography of precision double-sided polished silicon wafers at mesoscale can be exploited with the present invention to achieve excellent navigation grade vibratory gyroscope performance at low cost.

It should also be understood that to achieve the full potential of low drift and noise performance using this isolated resonator principle will require even higher final 3D mechanical precision than afforded by the precise wafer polishing, through-etched silicon micromachining and high quality silicon bonding outlined above. This can be preferably accomplished with this design by focused ion beam trimming, after the assembly of the resonator onto its baseplate, of the dimensions of the elastic beam elements or the mass elements of the resonator, e.g. plate or post. This post-assembly trimming can take advantage of the highly sensitive built in capacitive sensors to increase the degree of initial isolation and tuning to subatomic precision.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A resonator gyroscope, comprising:
   an isolated resonator including a counterbalancing plate and a proof mass;
   one or more double beam flexures each interconnecting the counterbalancing plate and the proof mass with a first and a second beam attached to the proof mass and a third and a fourth beam attached to the counterbalancing plate; and
   a baseplate affixed to the resonator by the one or more double beam flexures;
   wherein the counterbalancing plate and the proof mass transfer substantially no net momentum to the baseplate when the resonator is excited.

2. The resonator gyroscope of claim 1, wherein the counterbalancing plate and the proof mass each have a center of mass and transverse inertia symmetry about an axis that are substantially coincident and the counterbalancing plate and the proof mass together form two differential rocking modes of vibration transverse to the axis with substantially equal frequencies.

3. The resonator gyroscope of claim 1, wherein the counterbalancing plate has a rocking inertia substantially comparable to that of the proof mass.

4. The resonator gyroscope of claim 1, wherein the proof mass, the counterbalancing plate and the baseplate are machined from silicon.

5. The resonator gyroscope of claim 1, further comprising a mounting plate attached to the baseplate through at least one isolation flexure.

6. The resonator gyroscope of claim 1, wherein the one or more double beam flexures are integral to the counterbalancing plate.

7. The resonator gyroscope of claim 1, wherein at least two of the first, second, third and fourth beams are substantially parallel.

8. The resonator gyroscope of claim 1, wherein at least one of the first, third and fourth beams is independently machined to tune the isolated resonator.

9. The resonator gyroscope of claim 1, wherein the one or more double beam flexures each comprise a center beam affixed to the baseplate and the first and the second beam extend from the center beam and the third and the fourth beam extend from the center beam.

10. The resonator gyroscope of claim 9, wherein the center beam is substantially parallel to at least one of the first, second, third and fourth beams.

11. The resonator gyroscope of claim 9, wherein the center beam is affixed to the baseplate through a cross beam.

12. The resonator gyroscope of claim 11, wherein the one or more double beam flexures are each substantially symmetric about the cross beam.

13. The resonator gyroscope of claim 11, wherein the cross beam is affixed to the baseplate by at least a first baseplate post at a first end of the cross beam and a second baseplate post at a second end of the cross beam.

14. The resonator gyroscope of claim 11, wherein the cross beam is affixed to the baseplate through a substantially continuous seam along the cross beam.

15. The resonator gyroscope of claim 1, further comprising sense and drive electrodes affixed to the counterbalancing plate of the resonator.

16. The resonator gyroscope of claim 15, wherein the counterbalancing plate includes an extensive planar region for holding the sense and drive electrodes.

17. The resonator gyroscope of claim 1, wherein the proof mass includes a vertical portion and a central plate portion.

18. The resonator gyroscope of claim 17, wherein the vertical portion comprises a post attached to the central plate portion.

19. The resonator gyroscope of claim 17, wherein the resonator is isolated by changing a length of the vertical portion.

20. The resonator gyroscope of claim 1, wherein the isolated resonator further comprises at least one secondary element for trimming isolation of the resonator.

21. The resonator gyroscope of claim 20, wherein the at least one secondary element provides electrostatic control of a differential rocking mode of the isolated resonator.

22. A method of producing a resonator gyroscope, comprising the steps of:
   providing an isolated resonator including a counterbalancing plate and a proof mass;
   interconnecting the counterbalancing plate and the proof mass with one or more double beam flexures where each attach to the proof mass with a first and a second beam and each attach to the counterbalancing plate with a third and a fourth beam; and
   affixing a baseplate to the resonator by the one or more double beam flexures;
   wherein the counterbalancing plate and the proof mass transfer substantially no net momentum to the baseplate when the resonator is excited.

23. The method of claim 22, wherein the counterbalancing plate and the proof mass each have a center of mass and transverse inertia symmetry about an axis that are substantially coincident and the counterbalancing plate and the proof mass together form two differential rocking modes of vibration transverse to the axis with substantially equal frequencies.

24. The method of claim 22, wherein the counterbalancing plate has a rocking inertia substantially comparable to that of the proof mass.

25. The method of claim 22, wherein the proof mass, the counterbalancing plate and the baseplate are machined from silicon.

26. The method of claim 22, further comprising attaching a mounting plate to the baseplate through at least one isolation flexure.

27. The method of claim 22, wherein the one or more double beam flexures are integral to the counterbalancing plate.

28. The method of claim 22, wherein at least two of the first, second, third and fourth beams are substantially parallel.

29. The method of claim 22, wherein at least one of the first, second, third and fourth beams is independently machined to tune the isolated resonator.

30. The method of claim 22, wherein the one or more double beam flexures each comprise a center beam affixed to the baseplate and the first and the second beam extend from the center beam and the third and the fourth beam extend from the center beam.

31. The method of claim 30, wherein the center beam is substantially parallel to at least one of the first, second, third and fourth beams.

32. The method of claim 30, wherein the center beam is affixed to the baseplate through a cross beam.

33. The method of claim 32, wherein the one or more double beam flexures are each substantially symmetric about the cross beam.

34. The method of claim 32, wherein the cross beam is affixed to the baseplate by at least a first baseplate post at a first end of the cross beam and a second baseplate post at a second end of the cross beam.

35. The method of claim 32, wherein the cross beam is affixed to the baseplate through a substantially continuous seam along the cross beam.

36. The method of claim 22, further comprising affixing sense and drive electrodes to the counterbalancing plate of the resonator.

37. The method of claim 36, wherein the counterbalancing plate includes an extensive planar region for holding the sense and drive electrodes.

38. The method of claim 22, wherein the proof mass includes a vertical portion and a central plate portion.

39. The method of claim 38, wherein the vertical portion comprises a post attached to the central plate portion.

40. The method of claim 38, wherein the resonator is isolated by changing a length of the vertical portion.

41. The method of claim 22, further comprising providing at least one secondary element for trimming isolation of the resonator.

42. The method of claim 41, wherein the at least one secondary element provides electrostatic control of a differential rocking mode of the isolated resonator.

* * * * *

UNITED STATES PATENT AND TRADEMARK OFFICE
CERTIFICATE OF CORRECTION

PATENT NO. : 6,955,084 B2
DATED : October 18, 2005
INVENTOR(S) : Challoner et al.

It is certified that error appears in the above-identified patent and that said Letters Patent is hereby corrected as shown below:

Column 1,
Line 21, cancel text beginning with "This invention was made" to and ending "rights in this invention." at line 23, and insert the following statement:
-- The invention described herein was made in the performance of work under a NASA contract, and is subject to the provisions of Public Law 96-517 (35 U.S.C. 202) in which the Contractor has elected to retain title. --.

Signed and Sealed this

Seventh Day of February, 2006

JON W. DUDAS
*Director of the United States Patent and Trademark Office*